Patented May 19, 1953

2,639,221

UNITED STATES PATENT OFFICE 2,639,221

NONCAKING SODIUM AND POTASSIUM HYDROXIDE FOR PHOTOGRAPHIC DEVELOPER POWDERS

Richard W. Henn, Rochester, N. Y., assignor to Eastman Kodak Company, Rochester, N. Y., a corporation of New Jersey No Drawing. Application June 26, 1952,
Serial No. 295,803

8 Claims. (Cl. 23—184)

This invention relates to the prevention of caking of sodium or potassium hydroxide and more particularly to sodium or potassium hydroxide which has been treated with an agent to reduce the hygroscopic properties of these hydroxides so as to make them more suitable for use in photographic developer powders. Such agents impart noncaking and noncorrosive properties to the sodium or potassium hydroxide and are compatible with the other components of a developer powder.

While in many instances it is desirable to employ sodium or potassium hydroxides as alkaline constituents in photographic developer powders, their use is limited by their extremely hygroscopic nature and the consequent propensity to cause caking, corrosion and discoloration.

Because of the great tendency to cake, if absorption of even small amounts of moisture is permitted during storage, the stock of sodium or potassium hydroxide must often be broken up, granulated, and screened to permit removal of a portion for use in the developer composition.

An object of the present invention is, therefore, to provide a noncaking sodium or potassium hydroxide which is suitable for employment in photographic developer powder mixtures.

Another object of the invention is to reduce the hygroscopic properties of sodium hydroxide and potassium hydroxide.

In accordance with this invention, these and other objects are attained by coating the surface of sodium or potassium hydroxide powders with a thin coating of phthalic anhydride. This thin coating effectively prevents the hydroxides from becoming wet enough to cause caking.

The phthalic anhydride coating may be applied to the particles of the hydroxides in any suitable manner. For example, finely divided sodium hydroxide and finely divided phthalic anhydride may be intimately mixed together. The considerable vapor pressure of phthalic anhydride permits sublimation of the anhydride onto the caustic and this may be an important factor in producing a uniform, relatively impervious coating. If desired the sodium hydroxide may be subjected, without mixing, to phthalic anhydride vapors by heating the phthalic anhydride and suitably conducting the vapors to the sodium hydroxide. Another method of coating is to dip the granules or pellets of sodium hydroxide into a solution of phthalic anhydride. If desired the solution of phthalic anhydride, in a nonsolvent for caustic, may be sprayed onto the particles of sodium hydroxide. Similar methods can be employed with potassium hydroxide.

The invention will be further illustrated in the following examples.

Example 1

Ten grams of powdered sodium hydroxide were blended by mixing with 0.5 gram of powdered phthalic anhydride and the mixture allowed to stand for about one hour. This mixture was then exposed to severe conditions, a relative humidity of 60% and a temperature of 85° F. Observed in periods varying from 12 minutes to 2 hours, the mixture was found to be less damp and to cake substantially less than untreated sodium hydroxide.

Example 2

A mixture of 0.5 gram of phthalic anhydride and 10 grams of sodium hydroxide, blended as above, was further admixed with 25 grams of finely ground anhydrous sodium tetraborate. This was found to have retained its powder properties much better than a blend of borate and untreated sodium hydroxide, when exposed to the 60% relative humidity and 85° F. conditions of Example 1. When stored at 20% relative humidity the mixture remained substantially free-flowing, while the mixture with untreated sodium hydroxide caked and eventually liquefied.

Example 3

Mixtures of sodium hydroxide, sodium metaborate, and sodium sulfite, suitable for use as the "soda" portion of a developer-replenisher, and similar mixtures containing the further addition of potassium bromide, suitable for use as the soda portion of a developer, were made with (a) untreated sodium hydroxide, and (b) sodium hydroxide powders treated with phthalic anhydride as in Example 1. These were stored over a calcium chloride solution producing a relative humidity of 30 to 35%. Substantial caking was observed in the sample prepared with the untreated sodium hydroxide, while the samples prepared with the treated sodium hydroxide remained almost completely free flowing.

Example 4

Phthalic anhydride was dissolved in warm (60° C.) carbon tetrachloride to produce an approximately saturated solution. Powdered sodium hydroxide (40 mesh) was immersed in this solution, separated by filtering, and dried with mild heat. The resulting product was found more resistant to moisture adsorption and to caking than the untreated sodium hydroxide.

Example 5

Granular sodium hydroxide was suspended in a stainless steel screen basket over molten phthalic anhydride. Following treatment for 10 minutes, the sodium hydroxide was found to be coated to such an extent as to greatly resist coalescence when exposed to atmospheric moisture.

I claim:

1. The method of reducing the hydroscopic properties of sodium and potassium hydroxide which comprises coating the hydroxide with phthalic anhydride.

2. The method of reducing the hygroscopic properties of sodium and potassium hydroxide in the form of finely divided particles which comprises coating the particles by immersion in a solution of phthalic anhydride and drying the coated particles.

3. The method of reducing the hygroscopic properties of sodium and potassium hydroxide in the form of finely divided particles which comprises mixing finely divided particles of the hydroxide with finely divided particles of phthalic anhydride and vaporizing a coating of the phthalic anhydride onto the hydroxide.

4. The method of reducing the hydroscopic properties of sodium and potassium hydroxide in the form of finely divided particles which comprises exposing the particles to vapors of phthalic anhydride.

5. Sodium hydroxide, for use in photographic developer powders, coated with phthalic anhydride.

6. Finely divided sodium hydroxide particles having a coating of phthalic anhydride thereon.

7. Finely divided potassium hydroxide particles having a coating of phthalic anhydride thereon.

8. Potassium hydroxide for use in photographic developer powders, coated with phthalic anhydride.

RICHARD W. HENN.

No references cited.